March 4, 1952     G. B. WEBSTER     2,587,940
PIPE CLAMP

Filed Dec. 4, 1947     2 SHEETS—SHEET 1

INVENTOR.
GLEN B. WEBSTER
BY C. M. McKnight

March 4, 1952   G. B. WEBSTER   2,587,940
PIPE CLAMP
Filed Dec. 4, 1947   2 SHEETS—SHEET 2

INVENTOR.
GLEN B. WEBSTER
BY
C. M. McKnight

Patented Mar. 4, 1952

2,587,940

UNITED STATES PATENT OFFICE 2,587,940

PIPE CLAMP

Glen B. Webster, Bartlesville, Okla.

Application December 4, 1947, Serial No. 789,742

3 Claims. (Cl. 113—103)

This invention relates to a pipe clamp, and more particularly, but not by way of limitation, to an inside pipe clamp having expanding heads adapted for aligning the pipe ends during the welding thereof.

In the cross country laying of pipe lines considerable difficulty has been experienced in registering the end sections of the pipe to be welded, and particularly the end sections of large sized or large diameter pipe. It is necessary to bring the beveled end sections of the pipe to be welded into proper alignment or register so that the welding operation may be completed efficiently, and assure that the pipe is welded in substantially accurate alignment with no distortion or misalignment of the pipe. It is well recognized that recent patents have disclosed different structures for inside pipe clamps, particularly the patent to Elliot et al. Number 2,408,255, issued September 24, 1946, and the patent to Forbes Number 2,413,103, issued December 24, 1946. The above patents involve complex structures, as compared to the present invention which distinguishes clearly therefrom by providing a simple and efficient unit, which will permit an expeditious movement of the pipe clamp from one welded section to another, at the same time lining up the end sections of the pipe to be welded in proper registry to assure a satisfactory weld.

The present invention contemplates the use of an inside pipe clamp having radially expanding plates, or clamping members, and adapted to align the end sections of the pipe by an automatic spring urged latch pin which does not utilize any auxiliary structure to position the pin in path of movement of the pipe sections brought into end to end relationship with each other.

An important object of this invention is to provide an inside pipe clamp having expanding head members disposed in proximity of the adjacent end of pipes to be welded together, wherein the head members are brought into clamping position with the end sections of the pipe for properly aligning the pipe, so that the end sections thereof may be welded together in substantially perfect register.

Another object of this invention resides in a novel pipe clamp which will expeditiously align the end sections of pipes to be welded and then be moved with rapidity to successive end sections of pipe for successive welding operations.

An additional object of this invention is to provide an inside pipe clamp for aligning and clamping the end sections of pipe to be welded wherein the aligning means does not interfere with the welding of the pipe sections in any manner.

Another object of this invention is to provide an improved pipe clamp adapted for aligning and clamping the end sections of the pipe to be welded which is simple in construction and operation, efficient in use and capable of easy portability from one pipe welding operation to another.

Other objects and advantages of the invention will be evident from the following detailed description, read in conjunction with the accompanying drawings, which illustrate my invention.

Figure 3:
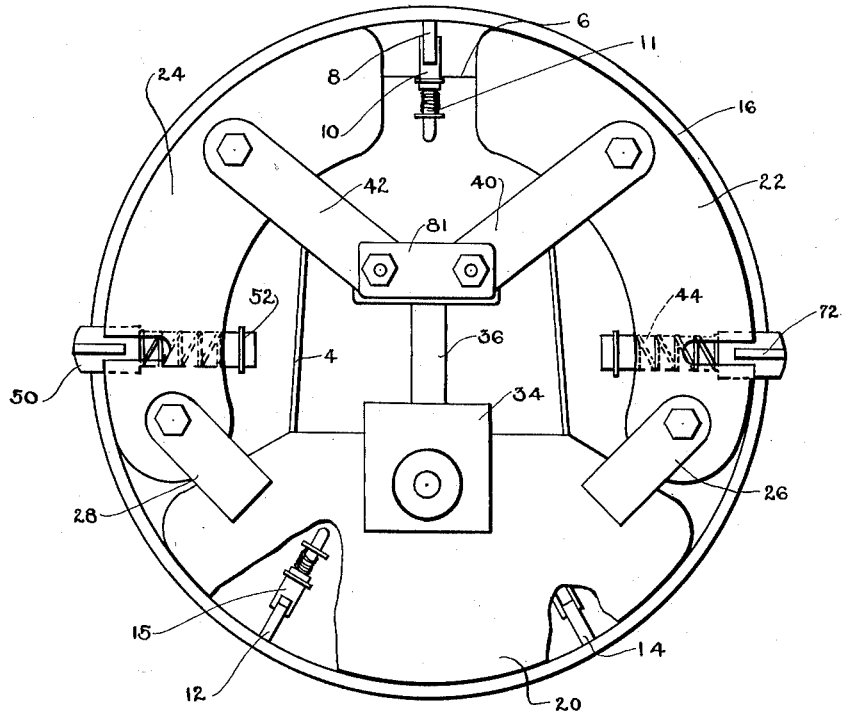
Figure 3 is a front elevation view of the clamp.

Referring to the drawings in detail, the pipe clamp is generally indicated by reference character 2 and comprises a longitudinal body member 4 having a vertical upstanding flange 6 secured integrally at one end thereof. A roller member 8 is disposed adjacent the uppermost portion of the flange 6 and secured in a bracket 10 provided on the flange 6. The roller member 6 is preferably spring urged by a helical spring 11 as shown in Figure 3. Additional roller members 12 and 14 are secured to the body 4 through bracket members 15. It will be apparent that the plurality of roller members provide circumferentially spaced rollers adapted to contact the inner periphery (Fig. 3) of the pipe 16 upon disposition of the clamp 2 in the pipe and thus facilitate movement of the clamp 2 through a pipe section. The body member 4 is provided with a front plate 18 having stationary clamp member 20 secured thereto as is clearly shown in Figure 3. The stationary clamp member 20 is adapted to co-operate with arcuately shaped movable clamping heads or members 22 and 24 connected to the member 20 by the bolted hinged plates 26 and 28 as is noted in Figure 3.

Figures 5, 6:
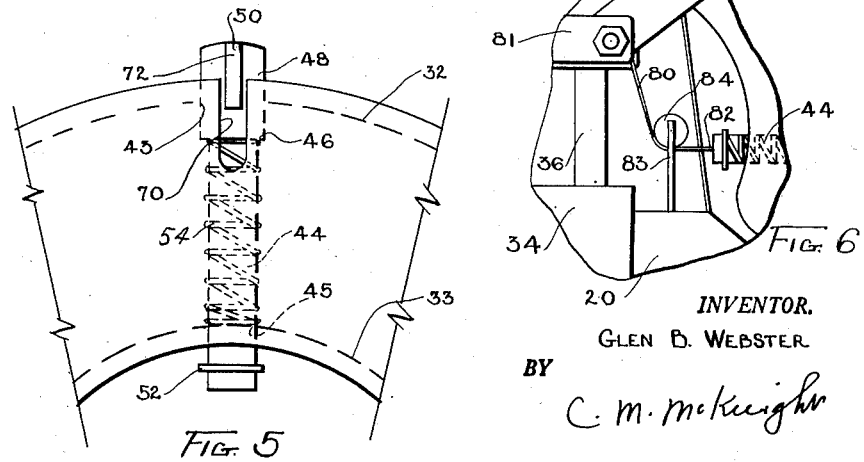
Figure 5 is a detailed view of the latch shown co-operating with a pipe clamping member, and slightly enlarged for clarity.
Figure 6 is a fragmentary detail view showing a modified structure for retracting the latches.

The stationary clamp and the movable clamp members 22 and 24 are formed from a plurality of spaced plate members 28 and 30 secured together by upper and lower connecting plates 32 (Fig. 5). It is clearly shown in Figures 1 and 2 the movable clamp members 22 and 24 in side elevation illustrate the spaced plates 28 and 30 and the upper connecting plate 32. This construction provides for hollow clamping members 20, 22 and 24 to decrease the weight of the clamp 2 and for a purpose that will be hereinafter set forth.

The usual gear box 34 is secured to the plate 18 in any suitable manner, and comprises a movable screw member 36 actuated by bevel gears (not shown) which in turn are actuated by an outwardly extending shaft 38 adapted to be rotated and provide vertical movement of the screw shaft 36 to cause movement of the clamping heads 22 and 24 through connecting toggle arms 40 and 42 respectively. Furthermore, vertical upward movement of the shaft 24 will move the arms 40 and 42 to cause an outward radial movement of the clamping members 22 and 24 and conversely downward vertical movement of shaft 36 and will cause a radial inward movement of the clamping members 22 and 24. It will thus be apparent that when it is desired to clamp two end sections of pipe, clamping members 22 and 24 are moved outward into clamping position as clearly shown in Figure 2. It will be understood that the stationary clamping member 20 is immovable.

Figure 4:
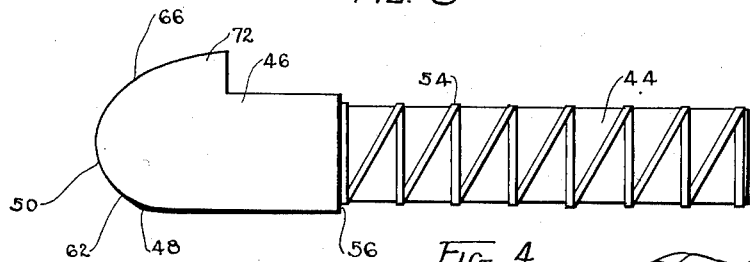
Figure 4 is a detailed view of the latch pin and actuating spring co-operating therewith.

As is clearly shown in Figure 5, the upper and lower connecting plates 32 and 33 are drilled with aligned bores 43 and 45 to receive a latch pin 44, shown in detail in Figure 4. The latch pin 44 comprises a shaft 45 of increased diameter at 46, which in turn is formed with an outwardly extending flange 48 containing a rounded or cam surface 50 for a purpose as will be hereinafter set forth. As shown in Figure 3 a latch pin 44 is adapted to be disposed on both clamp members 22 and 24 and extends through the drilled apertures 43 and 45 of the upper and lower connecting plates 32 and 33. A cotter pin 52 limits the movement of the pin 44 in one direction, while a helical spring 54 encircles the smaller diameter of the pin 44 and is anchored by the flange 46 at one end, and by the lower plate 33 at the opposite end. As is clearly shown in Figures 1, 2, 3 and 5, the enlarged portion 48 of the large pin is disposed outwardly adjacent the outer periphery of the clamping members 22 and 24. Furthermore, the pin is always urged by the tension of the helical spring 54 in an outward or radial direction at all times.

*Operation*

Figure 1:
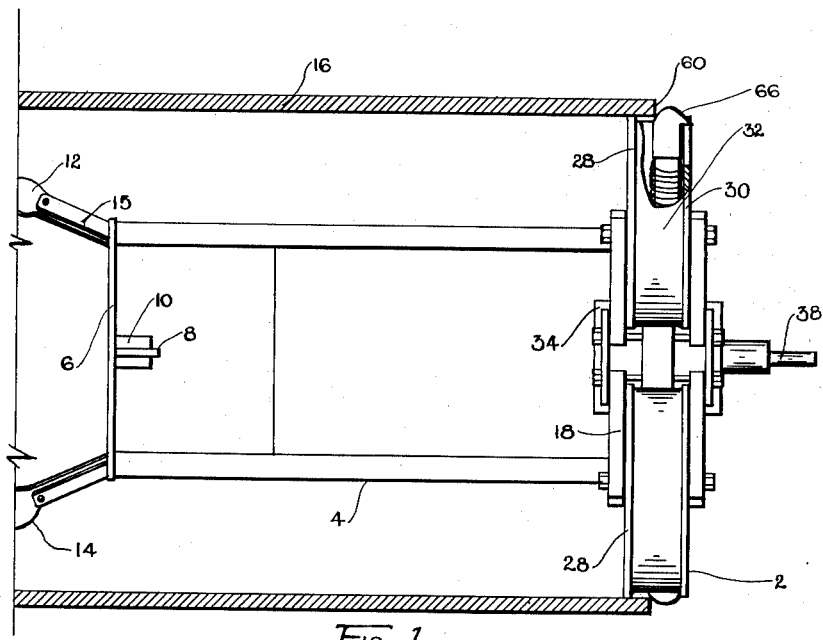
Figure 1 is a side sectional view with certain parts in elevation for clarity showing the pipe clamp utilized with a pipe section.

In cross country laying of pipe lines and particularly of large sized pipe wherein it is desired to weld the end section thereof in substantially perfect register, the clamp 2 is disposed in the interior of the pipe 16 or section of pipe 16 which is to be welded. As is clearly shown in Figure 1, the clamping members 22 and 24 are moved inwardly in order to permit the insertion and longitudinal movement of the clamp 2 in the pipe 16. As shown in Figure 1 the rear plate 28 may be disposed substantially adjacent to the end of the section 16, but is not in a clamping position. The constantly spring urged latch 44 is thereby placed into contact with the end 60 of the pipe section 16, and more particularly the rounded portion 62 of the cam surface 50 abuts thereagainst. It will be apparent that the latches are disposed in the clamping members 22 and 24 in a diametrically opposed relationship as clearly shown in Figure 3. A handle 38 having an extension (not shown) is rotated to move the clamp members 22 and 24 and plates 28 to a position adjacent to, but not in clamping position with the inner periphery of the pipe section 16. The additional section of pipe 17 that is to be welded with the section 16 is moved into contact with the pipe end 60, and as the pipe section 17 moves into longitudinal alignment with the pipe end 60, it will come into contact with the curved portion 66 of cam surface 50 of the latch pin 44, and ride upwardly thereon to cause a downward movement of the latch pin 44 against the tension of the spring 54. It will be apparent that the latch 44 only moves inwardly a sufficient amount to permit the proper alignment of the end sections of the pipes 16 and 17, at which time the handle 38 may be rotated to cause an outward radial movement of the clamp members 22 and 24 to cause a clamping of the pipes 16 and 17 in proper alignment by spaced plates 28 and 30 in order to be welded as at 68 shown in Figure 2. In this manner the pipe end sections have been properly aligned for the welding operation.

As is shown in Figure 5 the front plate 30 of the clamps 22 and 24 is provided with a radial slot 70 in order to permit the inward movement of the flange 48 and particularly the flat portion 72 against the tension of the spring 54 thereby permitting the proper position of the pipe 17 relative to the pipe 16. The upper bore 43 cooperates with the slot 70 to permit downward movement of the flange 48. It will be apparent the flat portion 72 acts as a guide to assure proper disposition of the cam surface 50 at all times.

Figure 2:
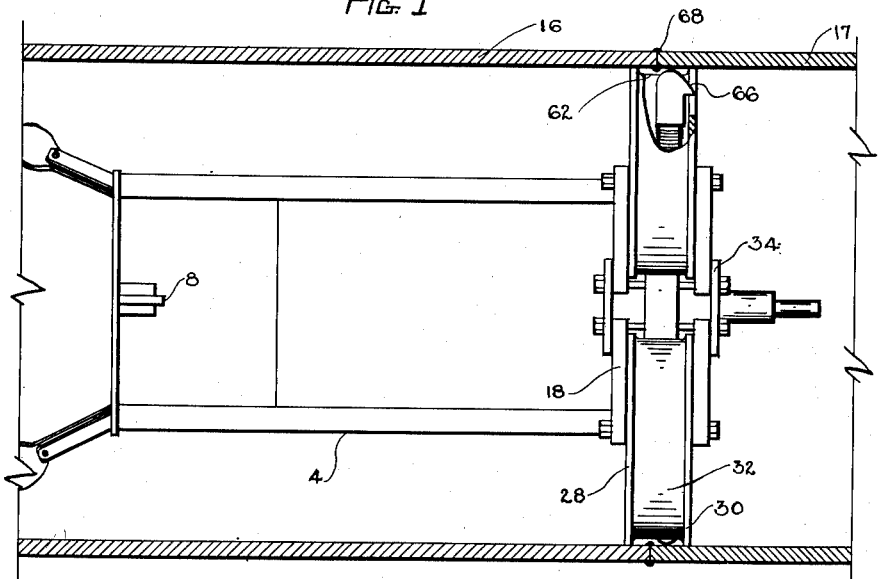
Figure 2 is a similar view showing the pipe clamp aligning end portions of welded pipe sections.

During the welding operation as clearly shown in Figure 2 it will be apparent that the rounded surface 62 of the flange 48 is spaced, or provides sufficient clearance as not to interfere with the welding operation in any manner, thereby assuring that the latching pins will not become welded to the end section of the pipe as is sometimes done. With the welding operation completed the clamp members 22 and 24 are moved inwardly to release the clamp or which may be manually moved through the interior of the pipe section by any suitable means such as the handle extension (not shown), in order to bring the clamp 2 in position with the next end section of pipe to be welded where the operation is repeated.

In Figure 6 is shown a modification wherein a wire line 80 is utilized for retracting the latch pins 44. Although in Figure 6 only one wire line 80 is shown attached to latch pin 44, it will be apparent that the line 80 is used with both latches. One end of the line 80 is anchored in any suitable manner to the cross-head 81 actuated by the screw 36 as hereinbefore set forth. The opposite end 82 of the wire line is anchored or connected to the butt end of a latch 44. A strap 83 is welded to the uppermost portion of member 20 and extends vertically upward therefrom for supporting a freely rotatable pulley 84. The wire 80 extends around the pulley 84, and is in engagement therewith as shown in Figure 6. The wire line 80 is an additional means to assure that the outer surface 50 of the latch 44 is completely in non-engaging relationship with the weld 68 as shown in Figure 2, and thereby preclude any possibility of welding the latch to the welded pipe sections. In an upward movement of the cross-head 81 by the screw 36 the wire line 80 will automatically pull on the latch 44 to cause a retraction or inward movement thereof. As the clamp is positioned in non-engaging position and the cross-head is moved to a down position, the wire line is permitted to slack, thereby allowing the spring 54 to force the latch into position for the next succeeding line-up of the pipe sections.

From the foregoing it will be apparent that the present apparatus provides an internal line-up clamp for pipe sections to be welded wherein the alignment of the end sections is done automatically through a pair of oppositely disposed latch pins adapted to extend beyond the peripheral edge of the clamping members. Furthermore, it will be apparent that the latch members are capable of being moved inwardly to an oncoming pipe section simultaneous with the alignment of the pipe section with an adjacent pipe section, thereby assuring that the meeting end faces of the pipe sections are clamped in proper alignment for a welding operation.

Changes may be made in the specification and drawings without departing from the spirit of the invention within the scope of the following claims, as set forth.

What I claim is:

1. In a pipe clamp for aligning the ends of pipe sections to be welded, and comprising a body member having a clamping ring, said ring comprising a stationary clamping member and a pair of movable clamping members having longitudinally spaced clamping surfaces adapted to engage the inner periphery adjacent the meeting ends of adjoining pipe sections, means for moving the clamping members into and out of engagement with the pipe sections, a latch pin provided in each of the movable clamping members and arranged in diametrically opposed relationship to each other, spring means normally urging said latch pins outwardly, said latch pins automatically adapted to contact the ends of the pipe sections to provide an alignment thereof prior to a clamping engagement of the clamping ring, said latch pins having a curved flange portion adapted to receive the oncoming pipe section thereupon to cause movement of the latch pin out of contact with the ends of the pipe sections.

2. An internal line-up clamp for pipe sections to be welded comprising a body member provided with a clamping ring, said clamping ring having a stationary clamping shoe and a plurality of movable clamping shoes cooperating therewith, said shoes having upper and lower plates to provide longitudinally spaced clamping surfaces adapted to engage the end portions of adjoining pipe sections, means for positioning the movable clamping shoes into and out of engagement with the pipe sections, aligned bores in the spaced plates of the movable clamping shoes, a latch pin disposed between the spaced plates and extending through the aligned bores in each of the movable shoes, an enlarged flange on one end of the latch pin, a helical spring encircling the latch pin and anchored between one of the spaced plates and the flange for positioning the flange outwardly from the peripheral edge of the clamping shoes, a cotter pin for limiting the outward movement of the latch pin, a slot in the clamping shoes acting as a guideway for the latch pin, said latch pin adapted to engage the end portions of adjacent pipe sections to provide an alignment thereof prior to a clamping engagement of the clamping shoes, a curved surface on the flange portion permitting disengagement of the latch pin from the end portions by movement of one pipe section into end engagement with the other pipe section.

3. An internal line-up clamp for pipe sections to be welded comprising a body member provided with a clamping ring, said clamping ring having a stationary clamping shoe and a plurality of movable clamping shoes cooperating therewith, said shoes having upper and lower plates to provide longitudinally spaced clamping surfaces adapted to engage the end portions of adjoining pipe sections, means for positioning the movable clamping shoes into and out of engagement with the pipe sections, aligned bores in the spaced plates of the movable clamping shoes, a latch pin disposed between the spaced plates and extending through the aligned bores in each of the movable shoes, an enlarged flange on one end of the latch pin, a helical spring encircling the latch pin and anchored between one of the spaced plates and the flange for positioning the flange outwardly from the peripheral edge of the clamping shoes, a cotter pin for limiting the outward movement of the latch pin, a slot in the clamping shoes acting as a guideway for the latch pin, said latch pin adapted to engage the end portions of adjacent pipe sections to provide an alignment thereof prior to a clamping engagement of the clamping shoes, a curved surface on the flange portion permitting disengagement of the latch pin from the end portions by movement of one pipe section into end engagement with the other pipe section, and means responsive to movement of the clamping members for retracting the latch to preclude engagement of the curved surface away from the welded portion of the pipe sections.

GLEN B. WEBSTER.

REFERENCES CITED

The following references are of record in the file of this patent:

UNITED STATES PATENTS

| Number | Name | Date |
| --- | --- | --- |
| 963,603 | Lunceford | July 5, 1910 |
| 1,087,683 | Pye | Feb. 17, 1914 |
| 1,964,926 | Moss | July 3, 1934 |
| 2,167,896 | Graham | Aug. 1, 1939 |
| 2,408,255 | Elliot | Sept. 24, 1946 |
| 2,413,103 | Forbes | Dec. 24, 1946 |
| 2,429,053 | Forbes | Oct. 14, 1947 |